United States Patent [19]
Ross et al.

[11] Patent Number: 4,590,367
[45] Date of Patent: May 20, 1986

[54] ARRANGEMENT FOR THE EXPANSION OF THE DYNAMIC RANGE OF OPTICAL DEVICES

[75] Inventors: Joseph Ross, Fort Salonga; Richard Schmidt, Huntington, both of N.Y.

[73] Assignee: Robotic Vision Systems, Inc., New York, N.Y.

[21] Appl. No.: 539,727

[22] Filed: Oct. 6, 1983

[51] Int. Cl.$^4$ .................................................. G01J 1/32
[52] U.S. Cl. ....................................... 250/205; 250/578
[58] Field of Search ........... 250/205, 578, 216, 211 R, 250/211 J, 213 R; 350/355, 356; 356/1, 4, 376, 381

[56] References Cited

U.S. PATENT DOCUMENTS

| | | | |
|---|---|---|---|
| 4,183,672 | 1/1980 | Raber et al. | 356/376 |
| 4,314,761 | 2/1982 | Reymond et al. | 350/356 |
| 4,441,096 | 4/1984 | Evanchuk | 250/205 |
| 4,494,874 | 1/1985 | Di Matteo et al. | 250/205 |

Primary Examiner—David C. Nelms
Attorney, Agent, or Firm—Max Fogiel

[57] ABSTRACT

Light intensity levels are measured at various locations in a scene and light amplified and/or attenuated by a device interposed between the source of light and the light-sensitive surface having a limited dynamic range. By attenuating bright regions and/or amplifying weak regions, the dynamic range of light intensities of the scene is reduced, thus enabling the limited dynamic range device to be used with scenes having a larger light intensity dynamic range. In applying the method to the receiving side of a 3-D measurement system employing projected light, a simpler system results and problems associated with modifying the high energy projected light are avoided. Also, a greater range of measured object surface reflectance is accommodated.

10 Claims, 3 Drawing Figures

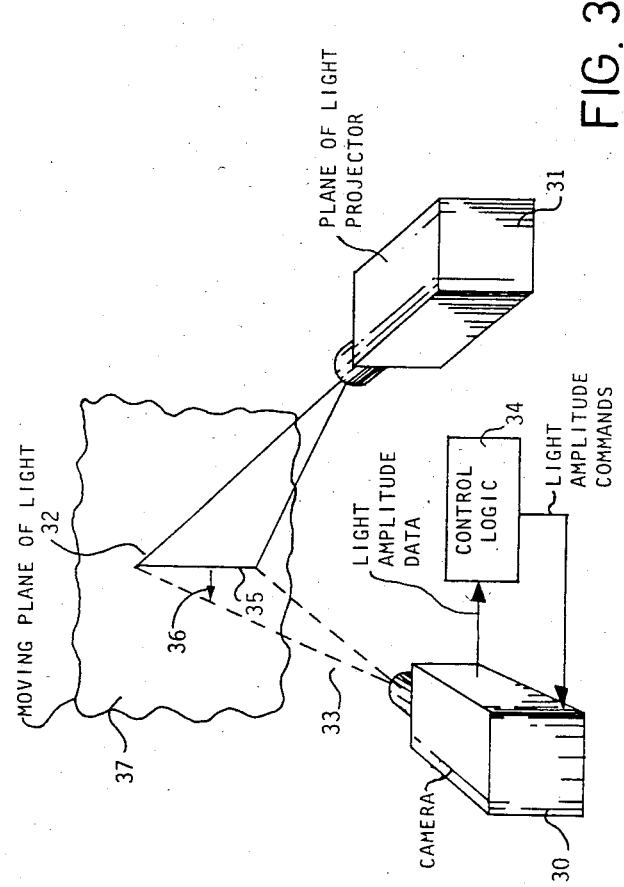

ARRANGEMENT FOR THE EXPANSION OF THE DYNAMIC RANGE OF OPTICAL DEVICES

BACKGROUND OF THE INVENTION

The range of light intensities occurring naturally or man-made are very great and often exceed the useable dynamic range of optical devices used to observe a scene. For example, a camera may be used to view a scene with local bright spots several orders of magnitude brighter than the surrounding area. The light-sensitive area of the camera may have a linear dynamic range of one or two orders of magnitude which is its useable range. Light intensity variations below this range are not discernable because there is insufficient light to be detected. Light intensity variations above this range are not discernable because the detection device saturates. The present invention provides a method to extend the dynamic range of optical devices.

A particular area of application of the invention is in 3-D measurement. When using projected light to illuminate an object to be measured, it is sometimes necessary to control the amount of illumination to cause the reflected light intensity to be within the proportional region of the light-sensitive detector signal range. It is difficult to correlate the light intensity adjustment required at a received pixel with the projected ray that produced the reflected light. Also, adjustments made in the projector often must operate at high energy levels, where the present invention can operate more simply at the lower received light levels.

SUMMARY OF THE INVENTION

It is an object of the present invention to overcome the above-mentioned prior-art disadvantages.

More particularly, it is an object of the present invention to expand the dynamic range of optical devices. It is also an object of this invention to simplify 3-D measurement using projected light.

In keeping with these objects, and with still others which will become apparent as the description proceeds, the present invention comprises determining the light intensity at every element (pixel) of the light-sensitive area of the optical device; adjusting the gain or attenuation at each pixel to bring the light level into the dynamic range of the light sensitive area; and repeating this process until all pixels are illuminated within their dynamic range.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

FIG. 3 is a diagrammatic view that shows an exemplary embodiment of the present invention applied to a 3-D measurement.

DESCRIPTION OF PREFERRED EMBODIMENTS

Figure 1:
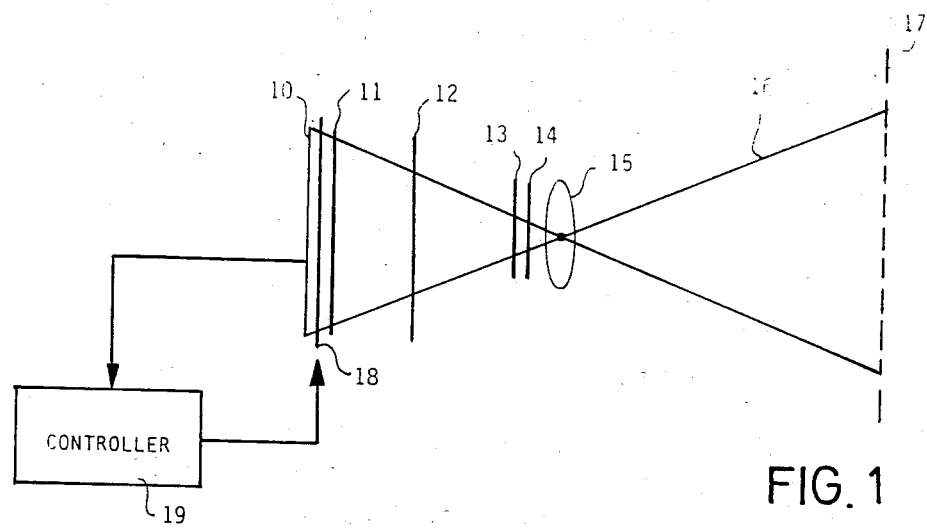
FIG. 1 is an optical schematic of a generalized optical device used with the present invention.

Conventional optical devices view a scene in the object plane 17 as shown in FIG. 1. Light 16 emanating from the scene is focused by lens 15 on the light-sensitive area 10. The device may contain an aperture control 14, shutter 13 or 11 and light blocking mechanism 12. Aperture control 14 sets the depth of focus and limits the amount of light admitted by the device. Shutter 13 or 11 blocks the light except for a prescribed time of exposure. Mechanism 12 can be a slow acting device that only allows light to pass in a brief interval surrounding the shutter exposure interval, if, for some reason, the shutter is not capable of blocking the light satisfactorily for periods long compared to the exposure interval. Light-sensitive area 10 may have a rated dynamic range less than the range of intensities imaged upon it which results in the loss of information. Here, rated dynamic range of the light-sensitive area is to be interpreted as the light intensity range in which its signal output is proportional to light intensity upon it. Changing the exposure time via shutter 11 or 13 will adversely affect weak intensity areas of the scene, if adjusted to accommodate strong intensity areas and vice versa.

Figure 2:
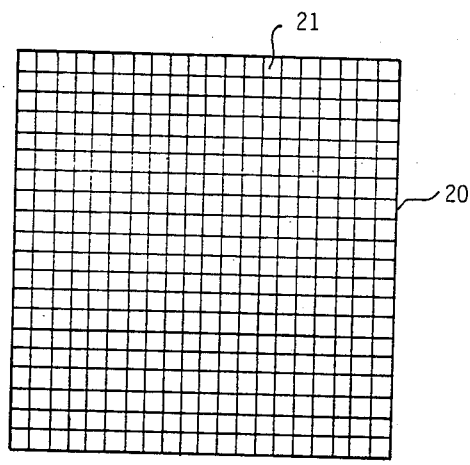
FIG. 2 is an axial view of an exemplary embodiment of the present invention.

To overcome this deficiency, the present invention provides a solution by placing an electrically controlled light modulator 18 adjacent to the light-sensitive area 10. Any modulator having individual pixel control (in general any pattern control can be used, but larger specialized patterns have narrower applicability) such as the rectangular patterned modulator 20 illustrated in FIG. 2. Each pixel 21 at an intersection of a row and column can amplify or attenuate the light passing through it in response to its individual control signal. If the modulator is only capable of attenuation, then wide dynamic range light amplifiers (e.g. micro channel plates) can amplify the light at any location in the light path.

The detected level of light intensity emerging from each pixel of the modulator 18 is then used to develop the control signals in controller 19 to adjust the amplification/attenuation of each pixel of modulator 18, to bring the level into the detector's rated dynamic range. Thus wide input light intensity dynamic range is reduced to a narrow dynamic range on a pixel by pixel basis.

If the modulator has sufficient speed, it can also perform the shuttering function and eliminate the requirement for a shutter at 11 or 13. Also, since many light-sensitive devices integrate the light over time, the product of exposure time and light intensity is the sought-after quantity. Therefore, in these instances, it is not necessary for each pixel modulator to have a continuous range of attenuation from off to on, but rather just two states (on and off) are required and the exposure time controlled to provide the correct product. This can simplify the modulator and controller design. As mentioned previously, light blocking mechanism 12 can supplement the light blocking property of the modulator, if it is insufficient for periods long compared to the exposure interval.

In FIG. 3, the invention is applied to reducing the dynamic range of reflected light 33 prior to reaching the light sensitive area within camera 30. The system shown, based on the prior art, is capable of making 3-D measurements of surface 37 by projecting a flying spot of light, a moving plane of light, or a coded volume of light, on to surface 37 from projector 31. A plane of light 32 is illustrated moving in direction 36 and intersecting surface 37 at line of intersection 35. Reflected light 33 from line of intersection 35 may contain a dynamic range of light greater than that which falls within the proportional signal range of the camera 30 light-sensitive area 10. Prior art methods required complicated computation within control logic 34 to generate light amplitude commands to control the projected light 32 intensity profile. By inserting light modulator 18 and using control logic 34 to perform the function of controller 19, the computations are greatly simplified, fewer loop iterations may be required and the modulation function is applied at a low energy point in the system rather than modulating the projected light at high energy levels in projector 31.

Although it is the intention of the present invention to eliminate the controlled intensity modification of the projected light 32, if used in conjunction with that method, a greater range of reflectance can be accommodated.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for reducing the dynamic range of light energy incident within an imaged optical scene, comprising the steps of: determining relative light energy levels in predetermined locations within said imaged scene; generating a control signal for each of said predetermined locations indicative of said energy levels; modifying said light energy levels by reducing said light energy at said predetermined locations where said light energy exceeds a predetermined high level and increasing said light energy at said predetermined locations where said light energy is below a predetermined low level; and repeating said steps until said light energy levels lie within said high and low levels.

2. Apparatus for reducing the dynamic range of light intensities within an optical scene, comprising: means for detecting light intensity levels at predetermined locations within the scene; means for generating correcting control signals from said light intensity levels; and means responding to said control signals to modify light impinging upon said means for detecting light intensity levels by reducing light intensity at said predetermined locations of the scene where the signal exceeds a predetermined high level and increasing the light intensity at said predetermined locations of the scene where the signal is below a predetermined low level.

3. An arrangement as defined in claim 2, wherein said means responding to said control signals comprises an electrically-controlled light modulator located in the light path adjacent to said means for detecting light intensity levels.

4. An arrangement as defined in claim 2, wherein said means for generating correcting control signals comprises logic means.

5. A method for improving and simplifying three-dimensional measurement, comprising the steps of: projecting a light pattern onto an object to be measured; producing relative motion between said object and said light pattern to effect a first scan; recording imaged reflected light energy levels from said projected light pattern upon said object; effecting a second scan while modifying the light energy levels at predetermined locations in said imaged reflected light by reducing said light energy at said predetermined locations where said light energy exceeded a predetermined high level in corresponding locations during the prior scan and increasing said light energy at said predetermined locations where said light energy was below a predetermined low level in corresponding locations during the prior scan; recording said modified light energy levels; and repeating the second scan step until said light energy levels lie within said high and low levels.

6. A method as defined in claim 5, including the step of converting said projected light pattern to a spot of light.

7. A method as defined in claim 5, including the step of converting said projected light pattern to a plane of light.

8. A method as defined in claim 5, including the step of modifying the energy level of said projected light pattern during said second scan and said repeated second scans to reduce said energy at locations on said object corresponding to locations in said imaged reflected light during said prior scan where said reflected light energy exceeded said high level and to increase said energy at locations on said object corresponding to locations in said imaged reflected light during said prior scan where said reflected light energy was below said low level.

9. A method for improving and simplifying three-dimensional measurement, comprising the steps of: projecting a volume of light of predetermined intensity onto an object to be measured; imaging reflected light energy levels from said projected light upon said object; creating a modification pattern by modifying said light energy levels at predetermined locations in said imaged reflected light by reducing said light energy at said predetermined locations where said light energy exceeds a predetermined high level and increasing said light energy at said predetermined locations where said light energy is below a predetermined low level; repeating said steps until said light energy levels lie within said high and low levels; maintaining said modification pattern; projecting a coded volume of light onto said object of said intensity; and recording imaged reflected light energy levels from said projected light upon said object.

10. A method as defined in claim 9, including the step of modifying the energy level of said projected volume of light to reduce said projected energy at locations on said object corresponding to locations in said imaged reflected light where said reflected light energy exceeds said high level and to increase said projected energy at locations on said object corresponding to locations in said imaged reflected light where said reflected light energy is below said low level; and using said modified projected energy levels when said coded volume of light is projected onto said object.

* * * * *